(12) United States Patent
Yoon et al.

(10) Patent No.: US 9,203,474 B2
(45) Date of Patent: Dec. 1, 2015

(54) REPEATER FOR POWER LINE COMMUNICATION AND REPEATING METHOD THEREOF

(71) Applicant: LSIS CO., LTD., Anyang-si, Gyeonggi-do (KR)

(72) Inventors: Jae Shik Yoon, Seoul (KR); Dong Sun Won, Hwaseong-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/532,927

(22) Filed: Nov. 4, 2014

(65) Prior Publication Data

US 2015/0146764 A1    May 28, 2015

(30) Foreign Application Priority Data

Nov. 28, 2013  (KR) ........................ 10-2013-0145889

(51) Int. Cl.
*H04B 3/36* (2006.01)
*H04B 3/58* (2006.01)
*H04B 3/54* (2006.01)
*H04L 12/705* (2013.01)

(52) U.S. Cl.
CPC .. *H04B 3/58* (2013.01); *H04B 3/54* (2013.01); *H04B 3/542* (2013.01); *H04L 45/18* (2013.01)

(58) Field of Classification Search
CPC ............ H04B 3/58; H04B 3/542; H04B 3/54; H04L 12/4641; H04L 27/2601; H04L 45/18
See application file for complete search history.

(56) References Cited

U.S. PATENT DOCUMENTS

2004/0223617 A1* 11/2004 Corcoran et al. ............. 380/266
2009/0135848 A1*  5/2009 Chan et al. ................... 370/464

FOREIGN PATENT DOCUMENTS

JP          11355293 A   * 12/1999
KR   10-2011-0096320        8/2011
KR      10-1122912           3/2012

OTHER PUBLICATIONS

Korean Intellectual Property Office Application Serial No. 10-2013-0145889, Office Action dated Aug. 31, 2014, 4 pages.

* cited by examiner

*Primary Examiner* — Syed Haider
(74) *Attorney, Agent, or Firm* — Lee, Hong, Degerman, Kang & Waimey (57) ABSTRACT

The present disclosure relates to a repeater for power line communication, capable of preventing a ping-pong phenomenon and a loss of data packet and improving communication reliability and communication speed by allowing a power line communication terminal to add its repeater number in a received data packet for transmission, and a repeating method thereof. A repeater for power line communication according to the disclosure comprises a power line communication concentrator to execute communication through a power line, and a plurality of power line communication terminals including a plurality of repeating power line communication terminals each having a repeating function and a repeater number set therefor, and configured to execute the communication with the power line communication concentrator through the power line, wherein the plurality of repeating power line communication terminals receive data packets, and repeat the data packets by adding their own repeater numbers in the data packets, respectively.

10 Claims, 3 Drawing Sheets

REPEATER FOR POWER LINE COMMUNICATION AND REPEATING METHOD THEREOF

CROSS-REFERENCE TO RELATED APPLICATION

Pursuant to 35 U.S.C. §119(a), this application claims the benefit of earlier filing date and right of priority to Korean Application No. 10-2013-0145889, filed on Nov. 28, 2013, the contents of which are all hereby incorporated by reference herein in its entirety.

BACKGROUND OF THE DISCLOSURE

1. Field of the Disclosure

This specification relates to power line communication, and more particularly, a repeater for power line communication and a repeating method thereof.

2. Background of the Disclosure

Power line communication is a type of communication method for transmitting data by using existing power lines, which are previously installed to supply an electric power, without installing an additional communication line for the data transmission.

The power line communication is considered as a communication method appropriate to be applied to various industrial fields, such as home networking, factory automation, telemetering and the like, in view of several advantages of low investment costs, and simplified communication in a manner of connecting a power line modem into a socket installed on a wall of a building.

The power line communication is configured by connecting a power line communication concentrator and a plurality of power line communication terminals to a power line, such that the power line communication concentrator and the plurality of power line communication terminals can receive operation power through the power line.

Also, the power line communication concentrator and the plurality of power line communication terminals mutually transmit a data including control signals, through the power line.

When the power line communication concentrator and the plurality of power line communication terminals connected through the power line perform communication, a communication-available distance is limited due to many noise signals existing along the power line, line resistance of the power line, interference phenomenon, and the like.

Therefore, to improve a communication environment of a communication-unavailable section of the power line communication, a power line communication terminal which is located at an end of a communication-available section is set to execute a repeating function.

The power line communication terminal set to perform the repeating function decides (determines) whether or not data (data packet) received from upper communication end (power line communication concentrator) or lower communication end (another power line communication terminal) is data to be repeated, and then repeats the received data when it is determined as the data to be repeated.

That is, when data received from the power line communication concentrator or another power line communication terminal is data to be repeated, the power line communication terminals which have been set to execute the repeating function restore an electric power level of the received data packet to its original electric power level, output the level-restored data packet through the power line and then repeat the corresponding data packet.

Korean Patent Application Nos. 2010-0015704 and 2010-0074610, which are the prior arts of the present disclosure, disclose a repeater and repeating method for power line communication.

Korean Patent Application No. 2010-0015704 discloses a repeater for power line communication and a repeating method thereof, in which data which has been repeated by power line communication terminals set as repeaters is not repeated again.

Meanwhile, in Korean Patent Application No. 2010-0074610, power line communication terminals which have been set to execute a repeating function for repeating a data packet previously add addresses, respectively, among a plurality of power line communication terminals which are connected to a power line to execute power line communication with a power line communication concentrator. Then, when a recipient address of the received data packet is the same as the pre-stored address, the received data packet is repeated.

However, when the power line communication terminals each set to execute the repeating function are connected to the power line in those prior arts, the plurality of power line communication terminals each having the repeating function receive the same data packet and simultaneously repeat the data packet.

Also, a ping-pong phenomenon that a power line communication terminal having the repeating function repetitively repeats the same data packet is caused in the prior arts.

This inevitably results in a data packet loss due to a data packet collision, non-smooth power line communication due to communication failure, and degradation of communication reliability and communication speed.

SUMMARY OF THE DISCLOSURE

Therefore, to overcome those related art problems, an aspect of the present disclosure is to provide a repeater for power line communication, capable of preventing a ping-pong phenomenon and a loss of data packet, and improving communication reliability and communication speed, and a repeating method thereof.

To achieve these and other advantages and in accordance with the purpose of this specification, as embodied and broadly described herein, there is provided a repeater for power line communication comprising:

a power line communication concentrator that is configured to execute communication through a power line; and a plurality of power line communication terminals that include a plurality of repeating power line communication terminals each having a repeating function and a repeater number set therefor, the plurality of power line communication terminals executing the communication with the power line communication concentrator through the power line, wherein the plurality of repeating power line communication terminals are configured to receive data packets and repeat the data packets by adding their own repeater numbers in the data packets, respectively.

Here, the repeater numbers may include a command repeater number and a response repeater number, and each of the repeating power line communication terminals may add the command repeater number when the data packet is the command data packet, and add the response repeater number when the data packet is the response data packet.

The command repeater numbers may be set for the repeating power line communication terminals from a small number to a great number in a sequential manner, starting from a repeating power line communication terminal located the closest to the power line communication concentrator, and the response repeater numbers may be set for the repeating power line communication terminals from a great number to a small number in a sequential manner, starting from the repeating power line communication terminal located the closest to the power line communication concentrator.

In a reverse manner, the command repeater numbers may be set for the repeating power line communication terminals from a great number to a small number in a sequential manner, starting from a repeating power line communication terminal located the closest to the power line communication concentrator, and the response repeater numbers may be set for the repeating power line communication terminals from a small number to a great number in a sequential manner, starting from the repeating power line communication terminal located the closest to the power line communication concentrator.

Here, when the repeating power line communication terminal receives a new data packet after repeating the data packet and decides that the newly-received data packet includes its own repeater number, the repeating power line communication terminal may filters out the newly-received data packet.

Also, the repeating power line communication terminal may calculate a repeating time based on a packet length and its repeater number, both included (in other words added) in the data packet, and then repeat the data packet after a lapse of the repeating time.

To achieve these and other advantages and in accordance with the purpose of this disclosure, as embodied and broadly described herein, there is provided a repeating method for power line communication comprising:

a repeater number setting step of setting a command repeater number and a response repeater number for each of repeating power line communication terminals of a plurality of power line communication terminals, which communicate with a power line communication concentrator;

a data packet receiving step of checking by each of the power line communication terminals address information included in a data packet and deciding whether or not the address information is its own address when the data packet is received by each of the plurality of power line communication terminals;

a repeating function setting deciding step of deciding by each of the plurality of power line communication terminals whether or not a repeating function has been set therefor, when it is decided that the address information is not its own address; and a data packet deciding step of deciding by each of the plurality of power line communication terminals whether the data packet is a command data packet or a response data packet when it is decided in the repeating function setting deciding step that the repeating function has been set, wherein it is decided whether or not the repeater number is added in the data packet according to the data packet deciding step, wherein the power line communication terminal received the data packet adds its own repeater number in the data packet and then outputs the data packet when the repeater number is not added in the data packet.

In accordance with an aspect of this disclosure, the method may further include a response data packet transmitting step of operating by each of the plurality of power line communication terminals according to data included in the data packet and generating a response data packet for transmission, when it is decided in the data packet receiving step that the address information is its own address.

In accordance with another aspect of this disclosure, the method may further include deciding whether or not a repeater number is added in the data packet; and filtering out the corresponding data packet and waiting for until the next data packet is received when it is decided that the repeater number is added in the data packet.

In accordance with still another aspect of this disclosure, the method may further include deciding whether or not a command repeater number is added in the data packet when it is decided in the data packet deciding step that the data packet is the command data packet;

adding its own command repeater number in the data packet when the command repeater number is not added; and outputting the data packet.

In accordance with still another aspect of this disclosure, the method may further include deciding whether or not a response repeater number is added in the data packet when it is decided in the data packet deciding step that the data packet is the response data packet;

adding its own response repeater number in the data packet when the response repeater number is not added; and outputting the data packet.

In accordance with still another aspect of this disclosure, the output of the data packet is executed after a lapse of a repeating time, calculated by multiplying a packet length of the data packet by the repeater number.

Further scope of applicability of the present application will become more apparent from the present disclosure given hereinafter. However, it should be understood that the present disclosure and specific examples, while indicating preferred embodiments of the disclosure, are given by way of illustration only, since various changes and modifications within the spirit and scope of the disclosure will become apparent to those skilled in the art from the present disclosure.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments disclosed herein to facilitate for the practice of those person skilled in the art to which the present disclosure belongs, with reference to the accompanying drawings. For the sake of explanation, thicknesses of lines, sizes of constituent elements and the like may be excessively illustrated in the drawings. Also, the terms used herein are defined taking into account of functions, and may differ depending on intent of a user or an operator or custom. Therefore, the definition of those terms should be given based on the overall description of this specification.

Figure 1:
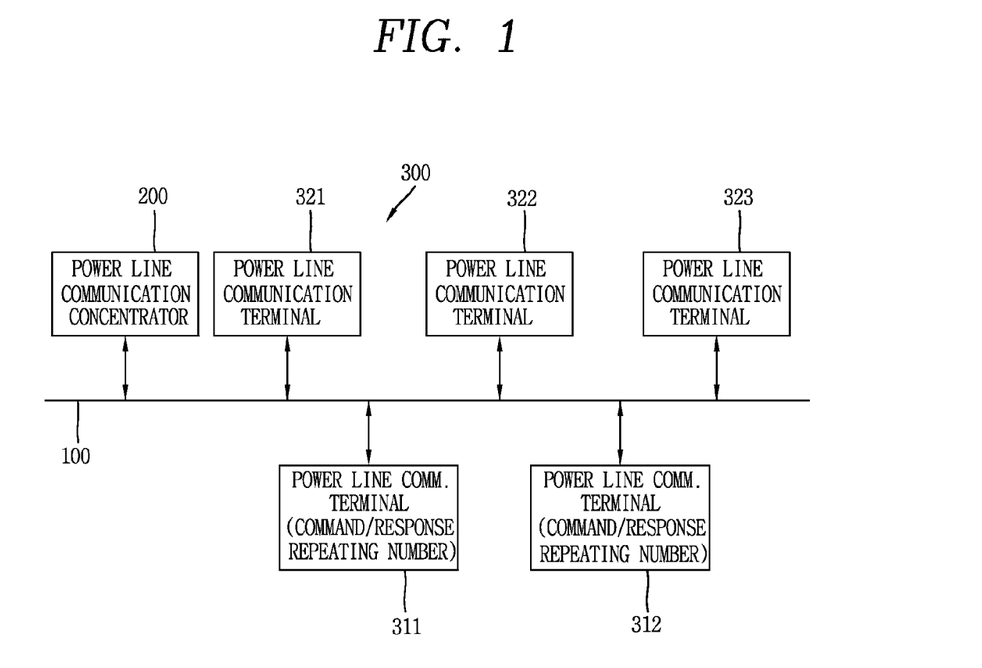
FIG. 1 is a block diagram illustrating a configuration of a repeater for power line communication according to a preferred embodiment of the present invention.

Hereinafter, a configuration of a repeater for power line communication according to the invention will be described with reference to FIG. 1. A reference numeral 100 designates a power line. The power line 100, for example, is used as a media to supply commercial alternating current (abbreviated as AC hereinafter) electric power of 200 volt (V), which is supplied to households, factories, or buildings.

A reference numeral 200 designates a power line communication concentrator, and 300 designates a plurality of power line communication terminals. The power line communication concentrator 200 and the plurality of power line communication terminals 300 are connected to the power line 100, so as to receive operation power supplied through the power line 100.

In such repeater for the power line communication, several power line communication terminals selected from the plurality of power line communication terminals 300 are previously set to execute a repeating function.

That is, the repeater for the power line communication includes power line communication terminals having the repeating function and power line communication terminals without the repeating function.

Hereinafter, to distinguish the two types of terminals, a power line communication terminal having a repeating function is referred to as a 'repeating power line communication terminal' and indicated with a reference numeral, starting with 310 (for example, 310 and 311). A power line communication terminal without a repeating function is referred to as a 'general power line communication terminal' and indicated with a reference numeral, starting with 320 (for example, 320 and 321).

Without distinguishing the two types of terminals, namely, for referring to both of 'repeating power line communication terminal' and 'general power line communication terminal', 'power line communication terminal' is used, and indicated with a reference numeral '300.'

The plurality of repeating power line communication terminals 311 and 312 execute power line communication with the adjacent power line communication concentrator 200 or the adjacent other repeating power line communication terminals 311 and 312.

The power line communication concentrator 200 and the plurality of power line communication terminals 300 are previously assigned with unique addresses, respectively.

The plurality of repeating power line communication terminals 311 and 312 are also previously assigned with unique repeater numbers, respectively.

Here, the repeater numbers include a command repeater number and a response repeater number. Therefore, each of the plurality of repeating power line communication terminals 311 and 312 is assigned with the command repeater number and the response repeater number. The command repeater number and the response repeater number may be assigned in reverse order.

Here, based on a position where the power line communication concentrator 200 is connected to the power line 100, the smallest command repeater number is assigned for an initial (first) repeating power line communication terminal 311 which is connected to the power line 100 at a position close to the position of the power line communication concentrator 200, sequentially increasing numbers are assigned for the following repeating power line communication terminals getting farther away from the position of the power line communication concentrator, and the greatest command repeater number is assigned for the last repeating power line communication terminal (not illustrated) which is connected to the power line at the farthest position away from the position of the power line communication concentrator.

For example, a command repeater number '00' is assigned to the repeating power line communication terminal 311 which is located the closest to the power line communication concentrator 200. A command repeater number '01' is assigned to the following repeating power line communication terminal 312. In this manner, the command repeater numbers are assigned to all of the repeating power line communication terminals 311, 312.

Here, the response repeater numbers may be assigned in the reverse order of the command repeater numbers. For example, a command repeater number assigned to the last repeating power line communication terminal (not illustrated) located the farthest from the power line communication concentrator 200 is assigned as a response repeating signal of the initial (first) repeating power line communication terminal 311. A command repeater number assigned to the first repeating power line communication terminal 311 is assigned as a response repeater number of the last repeating power line communication terminal (not illustrated).

Meanwhile, the method of setting the command repeater numbers and the response repeater numbers may also be reverse to the aforementioned method.

That is, the greatest command repeater number of those command repeater numbers is assigned (set) for the first repeating power line communication terminal 311 located the closest to the power line communication concentrator 200, sequentially descending (decreasing) command repeater numbers are assigned for the following repeating power line communication terminals, and the smallest command repeater number is set for the last repeating power line communication terminal (not illustrated) located the farthest from the power line communication concentrator 200.

Similarly, the response repeater numbers may also be assigned in reverse order of the command repeater numbers. A command repeater number assigned for the last repeating power line communication terminal (not illustrated) located farthest away from the power line communication concentrator 200 is assigned as a response repeater number of the first repeating power line communication terminal 311, and a command repeater number set for the first repeating power line communication terminal 311 is assigned as a response repeater number of the last repeating power line communication terminal.

According to the repeater for the power line communication according to the preferred embodiment of the present invention, when the power line communication concentrator 200 transmits a data to a predetermined power line communication terminal 300 through the power line 100, the power line communication concentrator 200 creates a data packet in which the data to transmit is included, and outputs the created data packet to the power line 100.

Also, the power line communication terminal 300 also processes predetermined data. When it desires to transmit data associated with the processed result, the power line communication terminal 300 creates a data packet (in other words, a response data packet) including the processed result data, and outputs the created response data packet to the power line 100.

Figure 2:
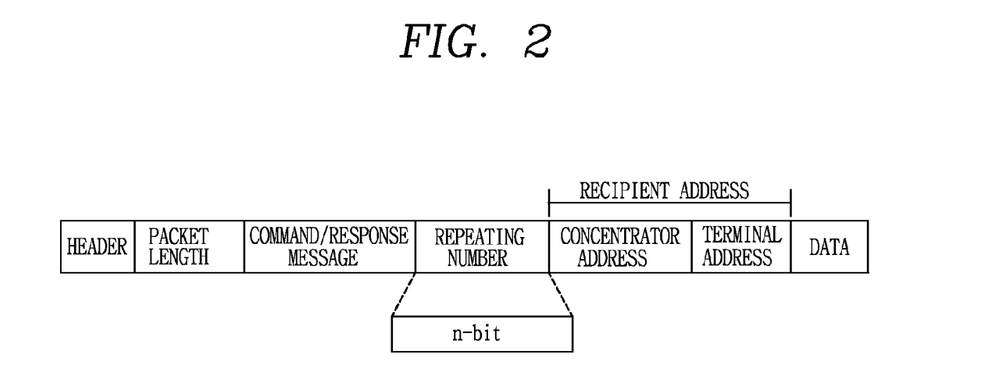
FIG. 2 is an exemplary view illustrating a preferred configuration of a data packet in a repeater for power line communication according to a preferred embodiment of the present invention.

The data packet, for example, referring to FIG. 2, includes areas for a header, a packet length, a command/response message, a repeater number, a recipient address and data. The recipient address area may be classified into a concentrator address area and a terminal address area.

Here, an entire length of the data packet is added in the packet length area. Data which indicates whether the data packet is either a command data packet or a response data packet is added in the command/response message area.

Also, a repeater number of a repeating power line communication terminal which repeats the data packet is written (added) in the repeater number area. The repeater number may be added (written) in the repeater number area in an n-bit unit.

Here, when the data packet is the command data packet, the command repeater number of the repeating power line communication terminal is added in the repeater number area. When the data packet is the response data packet, the response repeater number of the repeating power line communication terminal is added in the repeater number area.

The reception address area is an area for adding an address of a destination device to which the data packet is to be transmitted. When the destination device is the power line communication concentrator, the address of the power line communication concentrator is added in a concentrator address area. When the destination device is a power line communication terminal, an address of the corresponding power line communication terminal is added in a terminal address area.

The data area is an area for adding (writing) a data to transmit.

A data packet which the power line communication concentrator 200 or a predetermined power line communication terminal 300 outputs to the power line 300 is received by the power line communication terminal 300 or the power line communication concentrator 200. When a recipient address included in the received data packet is its own address, the power line communication terminal 300 or the power line communication concentrator 200 performs a predetermined operation according to the data included in the data packet.

Here, the power line communication terminals 300 extract contents of the data, performs the predetermined operation according to the extracted contents of the data, and creates a response data packet for transmission.

Meanwhile, the repeating power line communication terminal 311, 312 among the power line communication terminals 300 extracts a command/response message when the recipient address included in the received data packet is not its own address, and determines whether the data packet is either a command data packet transmitting a command data or a response data packet transmitting response data.

Here, when the received data packet is the command data packet, the repeating power line communication terminal 311, 312 writes (adds) its command repeater number in the repeater number area, and outputs the corresponding data packet to the power line 100 for repeating it.

If the received data packet is the response data packet, the repeating power line communication terminal 311, 312 writes (adds) its own response repeater number in the repeater number area, and outputs the corresponding data packet to the power line 100 for repeating it.

At that time, when the data packet is the command data packet, the repeating power line communication terminal 311, 312 calculates a repeating time using its command repeater number and a packet length. After the lapse of the calculated repeating time, the command data packet is output to the power line 100 to be repeated.

When the data packet is the response data packet, the repeating power line communication terminal 311, 312 which has received the data packet, calculates a repeating time using its response repeater number and the packet length. After the lapse of the calculated repeating time, the response data packet is output to the power line 100 to be repeated.

Here, the repeating time is calculated in a manner of multiplying the packet length by the command repeater number or response repeater number.

Meanwhile, when the repeating power line communication terminal 311, 312 receives a data packet from another repeating power line communication terminal after repeating the data packet, the repeating power line communication terminal 311, 312 checks data added in the command/response message field and the repeater number field. If the received data packet is the data packet repeated thereby (by its own), the repeating power line communication terminal 311, 312 filters out (i.e., deletes, removes) the corresponding data packet, thereby preventing the data packet from being repeated again.

Figure 3:
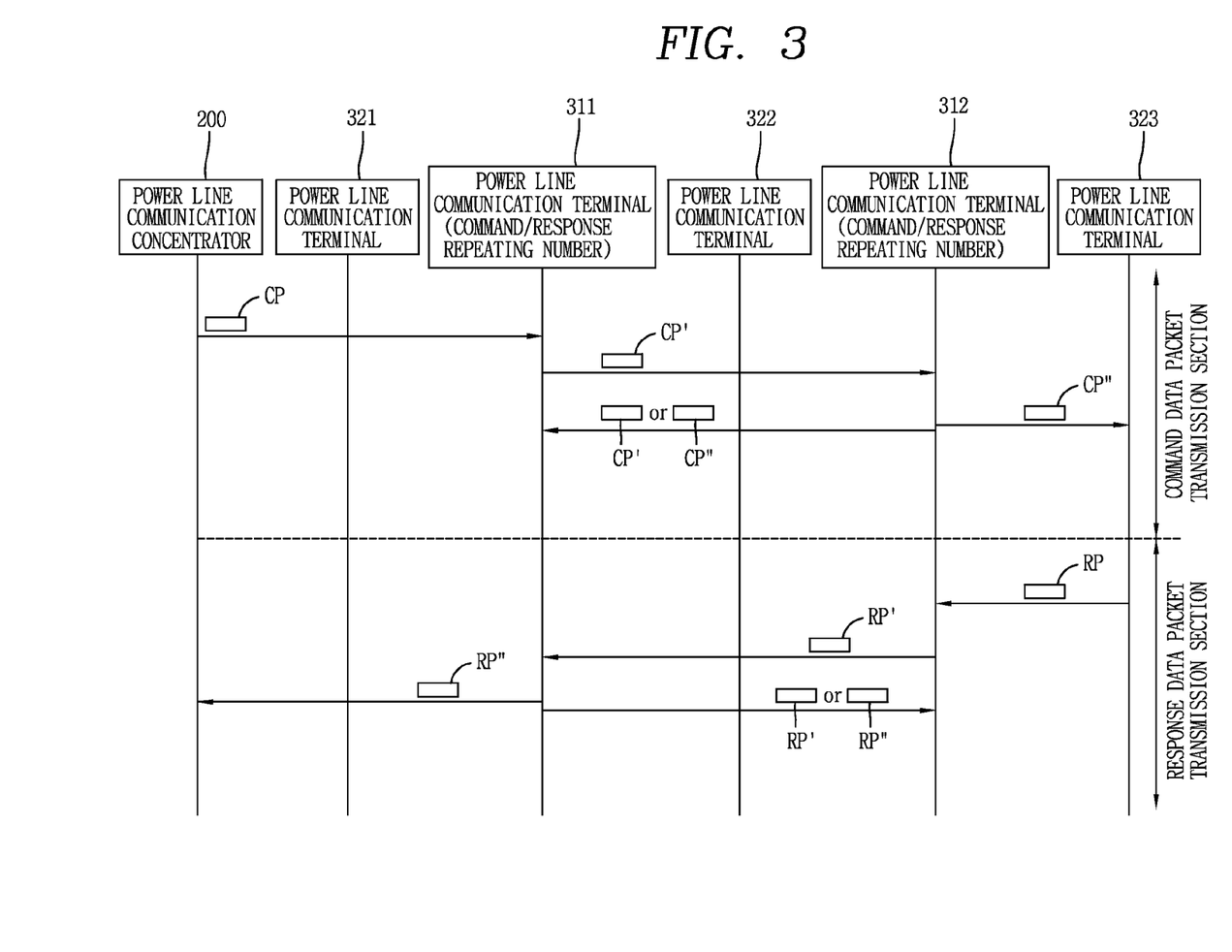
FIG. 3 is a diagram illustrating one exemplary flow of transmitting a data packet in a repeater for power line communication according to a preferred embodiment of the present invention.

Hereinafter, description will be given of a data packet transmission process in a repeater for power line communication using a data packet having the configuration as illustrated in FIG. 2, with reference to FIG. 3.

First, the power line communication concentrator 200 outputs to the power line 100 a command data packet (hereinafter, abbreviated as CP), in which an entire length of the data packet is added (written) in a packet length area, data for indicating the command data packet is added in a command/response message area, an address of a corresponding power line communication terminal is added in a recipient terminal address area, and a content desired to receive from the corresponding power line communication terminal is added in a data area.

Afterwards, when the first repeating power line communication terminal 311 receives the CP through the power line 100, the first repeating power line communication terminal 311 decides whether or not the address added in the recipient terminal address area is its own address.

If the address added in the recipient terminal address area is its own address, the first repeating power line communication terminal 311 carries out a predetermined operation according to the content added in the data area, and creates a response data packet for transmission.

However, if the address added in the terminal address area of the recipient address area is not its own address, the first repeating power line communication terminal 311 adds its command repeater number into the repeater number area of the received command data packet CP. The first repeating power line communication terminal 311 then outputs to the power line 100 a firstly-revised command data packet CP' to which the corresponding command repeater number has been added.

At that time, the first repeating power line communication terminal 311 calculates a repeating time by multiplying the packet length by its command repeater number, and then outputs the firstly-revised command data packet CP' to the power line 100 after the lapse of the repeating time.

Afterwards, when the second repeating power line communication terminal 312 receives the firstly-revised command data packet CP' through the power line 100, the second repeating power line communication terminal 312 decides whether or not the address added in the recipient terminal address area is its own address.

If the address added in the recipient terminal address area is its own address, the second repeating power line communication terminal 312 carries out a predetermined operation according to the content added in the data area, and creates a response data packet for transmission.

However, the address added in the recipient terminal address area is not its own address, the second repeating power line communication terminal 312 adds its command repeater number in the repeater number area, and then outputs to the power line 100 a secondly-revised command data packet CP" to which the command repeater number has been added.

Here, the second repeating power line communication terminal 312 calculates a repeating time by multiplying the packet length by its command repeater number, and then outputs the secondly-revised command data packet CP" to the power line 100 after the lapse of the repeating time.

Meanwhile, there may be cases of re-receiving the command data packet repeated by the first and/or second repeating power line communication terminal(s) 311 and/or 312, such as a case where the first repeating power line communication terminal 311 re-receives the firstly-revised command data packet CP' due to reflection within the power line or the like although the data packet has been output therefrom (output from itself), a case where the second repeating power line communication terminal 312 receives the secondly-revised command data packet CP" output therefrom (output from itself).

In those cases, the first or second repeating power line communication terminal 311 or 312 checks the repeater number area of the received command data packet. If its own command repeater number is added in the repeater number area of the received command data packet, the first or second repeating power line communication terminal 311 or 312 filters out (deletes) the command data packet without repeating it, thereby preventing re-repetition of the same command data packet.

When the secondly-revised command data packet CP" is transmitted to a power line communication terminal 323 having the address added in the terminal address area, the power line communication terminal 323 carries out a predetermined operation according to the content added (written) in the data area, and creates a response data packet (hereinafter, abbreviated as RP) to the power line 100 for output.

Here, the RP is configured such that an entire length of the response data packet is added in a packet length area, data for indicating the response data packet is added in a command/response message area, an address of the power line communication concentration 200 is added in a recipient terminal address area, and response data is added in a data area.

Afterwards, when the second repeating power line communication terminal 312 receives the RP output from the power line communication terminal 323, the second repeating power line communication terminal 312 decides whether or not its own address is added in the recipient address area. If its own address is not added, the second repeating power line communication terminal 312 adds its own response repeater number in the repeater number area, and then outputs to the power line 100 a firstly-revised response data packet RP' to which the response repeater number has been added.

Here, the second repeating power line communication terminal 312 calculates a repeating time by multiplying the packet length by its response repeater number, and then outputs the firstly-revised response data packet RP' to the power line 100 after the lapse of the repeating time.

Afterwards, when the first repeating power line communication terminal 311 receives the firstly-revised response data packet RP' through the power line 100, the first repeating power line communication terminal 311 decides whether or not the address added in the terminal address area of the recipient address area is its own address. If the address added in the recipient terminal address area is not its own address, the first repeating power line communication terminal 311 adds (writes) its own response repeater number into the repeater number area. The first repeating power line communication terminal 311 then outputs to the power line 100 a secondly-revised response data packet RP" to which the corresponding response repeater number has been added.

Here, the first repeating power line communication terminal 311 calculates a repeating time by multiplying the packet length by its response repeater number, and then outputs the secondly-revised response data packet RP" to the power line 100 after the lapse of the repeating time.

Meanwhile, there may be cases of re-receiving the response data packet repeated by the first and/or second repeating power line communication terminal(s) 311 and/or 312, such as a case where the second repeating power line communication terminal 312 re-receives the firstly-revised response data packet RP' due to reflection within the power line or the like although the data packet has been output therefrom (from itself), a case where the first repeating power line communication terminal 311 receives the secondly-revised response data packet RP" output therefrom (from itself).

In those cases, the second or first repeating power line communication terminal 312 or 311 checks the repeater number area of the received RP. If its own response repeater number is added in the repeater number area of the received RP, the second or first repeating power line communication terminal 312 or 311 filters out (deletes) the corresponding RP without repeating it, thereby preventing re-repetition of the same RP.

When the secondly-revised response data packet RP" is transmitted to the power line communication concentrator 200 having the address added in a concentrator address area, the power line communication concentrator 200 carries out a predetermined operation according to the content added in the data area.

Figure 4:
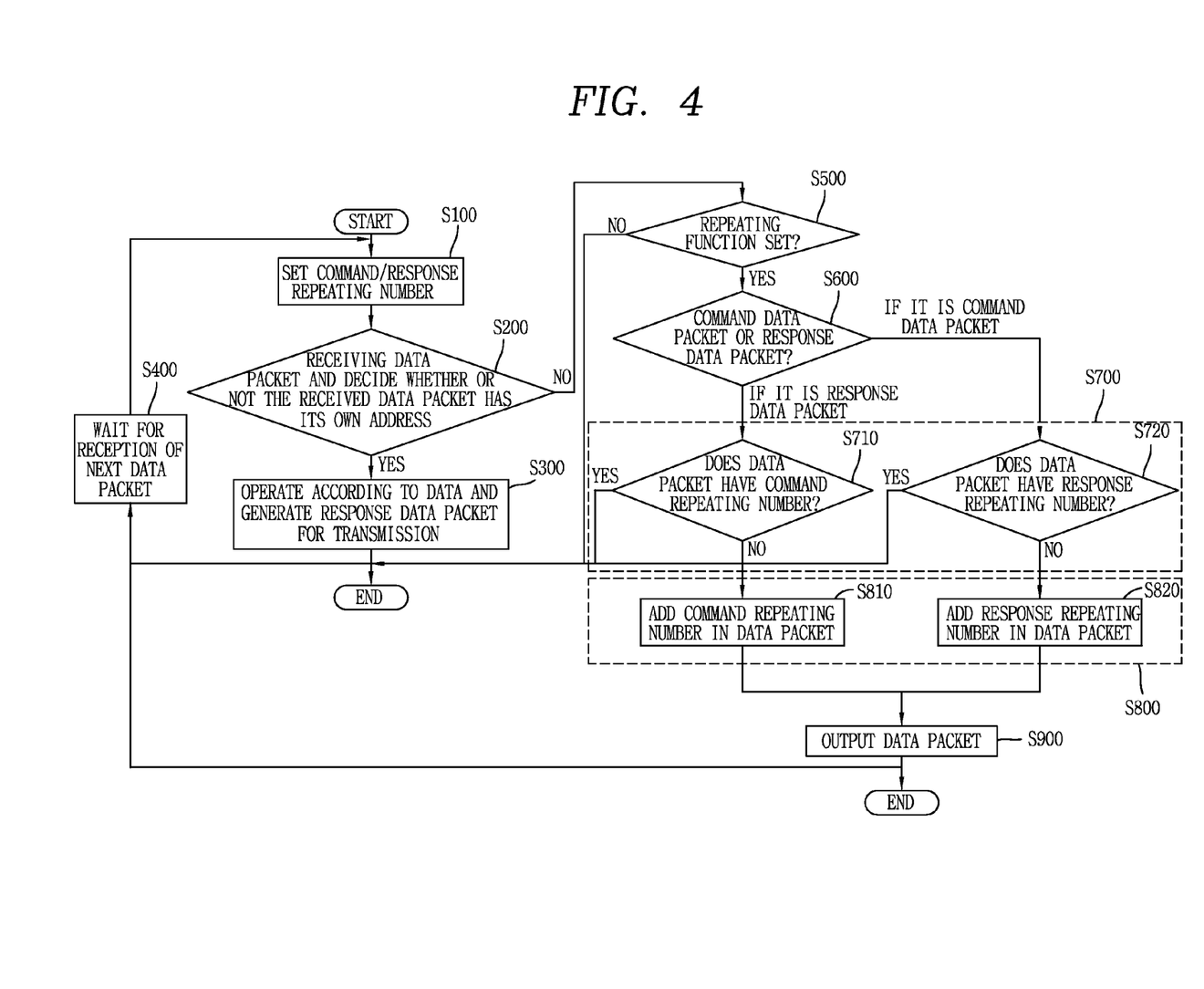
FIG. 4 is a flowchart illustrating a method of transmitting a data packet in a repeater for power line communication according to a preferred embodiment of the present invention.

Hereinafter, description will be given of a method of transmitting a data packet in a repeater for power line communication disclosed herein, with reference to FIG. 4.

A method of transmitting a data packet in a repeater for power line communication disclosed herein includes a repeater number setting step (S100) of setting a command repeater number and a response repeater number for each of repeating power line communication terminals of a plurality of power line communication terminals which communicate with a power line communication concentrator. The setting step may be implemented by inputting setting data by a user through a user interface unit (not illustrated), which is provided in the power line communication concentrator or separately provided, storing the setting data in a memory (not illustrated) within the power line communication concentrator, and transmitting the setting data from the power line communication concentrator to each of the plurality of power line communication terminals through a power line so as to be added in a memory installed in each power line communication terminal.

Here, the command repeater number and the response repeater number which are set in each of the repeating power line communication terminals may be set in a reverse order.

For example, upon setting the command repeater numbers, the command repeater numbers may be set for all of the power line communication terminals in such a manner that the smallest command repeater number may be set for a repeating power line communication terminal, which is located the closest to the power line communication concentrator, sequentially increasing command repeater numbers are set for the following repeating power line communication terminals, getting farther away from the power line communication concentrator, and then the greatest command repeater number is set for a repeating power line communication terminal which is located the farthest away from the power line communication concentrator.

Upon setting the response repeater numbers, on the other hand, the response repeater numbers may be set for all of the power line communication terminals in such a manner that the greatest response repeater number is set for a repeating power line communication terminal which is located the closest to the power line communication concentrator, sequentially decreasing response repeater numbers are set for the following repeating power line communication terminals, getting farther away from the power line communication concentrator, and then the smallest response repeater number is set for a repeating power line communication terminal which is located the farthest away from the power line communication concentrator.

Of course, the method of setting the command repeater number and the response repeater number for each of the repeating power line communication terminals may be executed opposite to the aforementioned setting methods, and other setting methods may also be applied.

The method may then include a data packet receiving step (S200) of checking by a power line communication terminal address information related to a data packet and deciding whether or not the address information is an its own address when the data packet is received.

When it is checked in the data packet receiving step S200 that the address information in the data packet is its own address of the power line communication terminal, the power line communication terminal operates according to data included in the data packet, and then a response data packet transmitting step (S300) may be executed in which the power line communication terminal creates and transmits a response data packet.

When the response data packet transmitting step S300 is completed, the power line communication terminal waits for until the next data packet is received (S400).

If it is checked in the data packet receiving step S200 that the address information in the data packet is not its own address of the power line communication terminal, a repeating function setting deciding step (S500) is executed in which the power line communication terminal which has received the data packet decides whether or not it has a repeating function set therein.

Here, if it is determined in the repeating function setting deciding step S500 that it does not have the set repeating function, the power line communication terminal waits for until the next data packet is received without executing any operation (S400).

If it is decided in the repeating function setting deciding step S500 that it has the set repeating function, a data packet deciding step (S600) is executed in which the power line communication terminal decides whether the data packet is a command data packet or a response data packet.

After the data packet deciding step S600 is completed, a repeater number add deciding step (S700) is executed in which the power line communication terminal decides whether or not its repeater number is added in the data packet.

Here, if it is decided in the data packet deciding step S600 that the data packet is the command data packet, the power line communication terminal decides in the repeater number add deciding step (S700) whether or not the data packet has added its own command repeater number (S710).

On the other hand, it is decided in the data packet deciding step (S600) that the data packet is the response data packet, the power line communication terminal decides in the repeater number add deciding step (S700) whether or not the data packet has added its own response repeater number (S720).

Meanwhile, if it is decided in the repeater number add deciding step S700 that its own repeater number is added, the power line communication terminal decides that the data packet is a data packet which it has previously repeated, and waits for until the next data packet is received (S400).

If it is decided in the repeater number add deciding step S700 that its own repeater number has not been added, the power line communication terminal executes a repeater number adding step (S800) of adding its own repeater number in the data packet.

Here, if it is decided in the data packet deciding step S600 that the data packet is the command data packet, the power line communication terminal adds in the repeater number adding step S800 its command repeater number in the data packet (S810).

If the data packet is decided as the response data packet in the data packet deciding step S600, the power line communication terminal stores in the repeater number adding step S800 its response repeater number in the data packet (S820).

Afterwards, a data packet outputting step (S900) is executed in which the power line communication terminal outputs the data packet having the repeater number added.

Meanwhile, during the data packet outputting step S900, the power line communication terminal calculates a repeating time based on a packet length added in the data packet and its own repeater number, and then outputs the data packet after the lapse of the repeating time.

That is, when the data packet is the command data packet, the power line communication terminal calculates the repeating time by multiplying the packet length by its command repeater number. When the data packet is the response data packet, the power line communication terminal calculates the repeating time by multiplying the packet length by its response repeater number.

After outputting the data packet, the power line communication terminal waits for until the next data packet is received (S400).

As described above, when a power line communication terminal having a repeating function set therein receives a data packet, it decides whether the data packet has added its own repeater number. If the data packet has added its own repeater number, the power line communication terminal decides that the data packet is a data packet repeated from itself and thus does not re-repeat the data packet through filtering the corresponding data packet. Accordingly, a ping-pong phenomenon of repetitively transmitting and receiving data packets can be prevented in advance. This may result in reducing communication failure and allowing smooth power line communication, thereby enhancing communication reliability and communication speed.

Also, the power line communication terminal outputs the data packet by setting a repeating time of the data packet based on a packet length and its own repeater number. This may prevent different power line communication terminals from simultaneously outputting the same data packet, thereby avoiding the loss of data packet due to a data packet collision.

The configurations and methods of the repeater for power line communication and the repeating method thereof may not be limitedly applied, but such embodiments may be configured by a selective combination of all or part of the embodiments so as to implement many variations.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A repeater for power line communication comprising:
a power line communication concentrator that is configured to execute communication through a power line; and
a plurality of power line communication terminals that include a plurality of repeating power line communication terminals each having a repeating function and a repeater number set therefor, the plurality of power line communication terminals executing the communication with the power line communication concentrator through the power line,
wherein the plurality of repeating power line communication terminals are configured to receive data packets and repeat the data packets by adding their own repeater numbers in the data packets, respectively,
wherein each of the plurality of repeating power line communication terminals are configured to calculate a repeating time based on a packet length and its repeater number, both added in the data packet, and then to repeat the data packet after a lapse of the repeating time.

2. The repeater of claim 1, wherein the repeater numbers comprise a command repeater number and a response repeater number, and
wherein each of the repeating power line communication terminals adds the command repeater number when the data packet is the command data packet, and adds the response repeater number when the data packet is the response data packet.

3. The repeater of claim 2, wherein the command repeater numbers assigned to the plurality of repeating power line communication terminals are set from a small number to a great number in a sequentially increasing manner, starting from a repeating power line communication terminal located the closest to the power line communication concentrator, and
wherein the response repeater numbers are set for the repeating power line communication terminals from a great number to a small number in a sequentially decreasing manner, starting from the repeating power line communication terminal located the closest to the power line communication concentrator.

4. The repeater of claim 2, wherein the command repeater numbers assigned to the plurality of repeating power line communication terminals are set from a great number to a small number in a sequentially decreasing manner, starting from a repeating power line communication terminal located the closest to the power line communication concentrator, and
wherein the response repeater numbers are set for the repeating power line communication terminals from a small number to a great number in a sequentially increasing manner, starting from the repeating power line communication terminal located the closest to the power line communication concentrator.

5. The repeater of claim 1, wherein when the repeating power line communication terminal receives a new data packet after repeating the data packet and decides that the newly-received data packet includes its own repeater number, the repeating power line communication terminal is configured to filter out the newly-received data packet.

6. A repeating method for power line communication comprising:
a repeater number setting step of setting a command repeater number and a response repeater number for each of repeating power line communication terminals of a plurality of power line communication terminals, which communicate with a power line communication concentrator;
a data packet receiving step of checking by each of the power line communication terminals address information included in a data packet and deciding whether or not the address information is its own address when the data packet is received by each of the plurality of power line communication terminals;
a repeating function setting deciding step of deciding by each of the plurality of power line communication terminals whether or not a repeating function has been set therefor, when it is decided that the address information is not its own address; and
a data packet deciding step of deciding by each of the plurality of power line communication terminals whether the data packet is a command data packet or a response data packet when it is decided in the repeating function setting deciding step that the repeating function has been set,
wherein it is decided whether or not the repeater number is added in the data packet according to the data packet deciding step, wherein the power line communication terminal received the data packet adds its own repeater number in the data packet and then outputs the data packet when the repeater number is not added in the data packet,
wherein the output of the data packet is executed after a lapse of a repeating time, calculated by multiplying a packet length of the data packet by the repeater number.

7. The method of claim 6, further comprising a response data packet transmitting step of operating by each of the plurality of power line communication terminals according to data included in the data packet and generating a response data packet for transmission, when it is decided in the data packet receiving step that the address information is its own address.

8. The method of claim 6, further comprising:
deciding whether or not a repeater number is added in the data packet; and
filtering out the corresponding data packet and waiting for until the next data packet is received when it is decided that the repeater number is added in the data packet.

9. The method of claim 6, further comprising:
deciding whether or not a command repeater number is added in the data packet when it is decided in the data packet deciding step that the data packet is the command data packet;
adding its own command repeater number in the data packet when the command repeater number is not added; and
outputting the data packet.

10. The method of claim 6, further comprising:
deciding whether or not a response repeater number is added in the data packet when it is decided in the data packet deciding step that the data packet is the response data packet;
adding its own response repeater number in the data packet when the response repeater number is not added; and
outputting the data packet.

* * * * *